United States Patent
Kwon et al.

(10) Patent No.: US 6,671,010 B2
(45) Date of Patent: Dec. 30, 2003

(54) ARRAY SUBSTRATE FOR LCD DEVICE AND METHOD OF FABRICATING THE SAME

(75) Inventors: Keuk-Sang Kwon, Gyeongsangbuk-do (KR); In-Duk Song, Gyeongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 42 days.

(21) Appl. No.: 09/997,014

(22) Filed: Nov. 30, 2001

(65) Prior Publication Data

US 2002/0097364 A1 Jul. 25, 2002

(30) Foreign Application Priority Data

Dec. 1, 2000 (KR) ........................................ 2000-72245

(51) Int. Cl.[7] ............................................. G02F 1/1343
(52) U.S. Cl. ............................................ 349/43; 349/41
(58) Field of Search ............................... 349/41, 42, 43

(56) References Cited

U.S. PATENT DOCUMENTS

| 5,694,185 A | 12/1997 | Oh ................................. 349/46 |
| 6,133,977 A | 10/2000 | Lee et al. ...................... 349/141 |
| 6,215,541 B1 * | 4/2001 | Song et al. ..................... 349/41 |

FOREIGN PATENT DOCUMENTS

JP          60-192369          9/1985

* cited by examiner

Primary Examiner—Toan Ton
Assistant Examiner—Hoan Nguyen
(74) Attorney, Agent, or Firm—McKenna Long & Aldridge LLP

(57) ABSTRACT

An array substrate for a liquid crystal display device includes a substrate; a gate line arranged in a transverse direction on the substrate; a data line arranged perpendicular to the gate line and forming a pixel region with the gate line; and a thin film transistor positioned near an intersection of the gate and data lines. The thin film transistor includes a gate electrode, an active layer, a source electrode, and a drain electrode. The gate electrode has a slanted corner slanted from the gate electrode to the gate line. The source electrode has a U shape and is positioned over the gate electrode. The drain electrode has a drain protrusion which is positioned over the gate electrode and the slanted corner of the gate electrode and located inside the U-shaped source electrode. The drain protrusion is spaced apart from the U-shaped source electrode to form a channel region therebetween. An imaginary axis of the U-shaped source electrode and drain protrusion forms an angle with the gate line. A pixel electrode contacts the drain electrode.

28 Claims, 10 Drawing Sheets

ARRAY SUBSTRATE FOR LCD DEVICE AND METHOD OF FABRICATING THE SAME

This application claims the benefit of Korean patent application No. 2000-72245, filed on Dec. 1, 2000 in Korea, which is hereby incorporated by reference as if fully set forth herein.

BACKGROUND OF THE INVENTION

1. Field of the Invention

The present invention relates to a liquid crystal display device, and more particularly to an array substrate having thin film transistors (TFTs) each implanting a compact structure.

2. Discussion of the Related Art

In general, liquid crystal display (LCD) devices make use of optical anisotropy and polarization properties of liquid crystal molecules to control arrangement orientation. The arrangement direction of the liquid crystal molecules can be controlled by an applied electric field. Accordingly, when an electric field is applied to liquid crystal molecules, the arrangement of the liquid crystal molecules changes. Since refraction of incident light is determined by the arrangement of the liquid crystal molecules, display of image data can be controlled by changing the electric field applied to the liquid crystal molecules.

Of the different types of known LCDs, active matrix LCDs (AM-LCDs), which have thin film transistors and pixel electrodes arranged in a matrix form, are the subject of significant research and development because of their high resolution and superiority in displaying moving images.

The typical liquid crystal display (LCD) panel has an upper substrate, a lower substrate and a liquid crystal layer interposed therebetween. The upper substrate, commonly referred to as a color filter substrate, usually includes a common electrode and color filters. The lower substrate, commonly referred to as an array substrate, includes switching elements, such as thin film transistors (TFTs), and pixel electrodes.

FIG. 1 is an exploded perspective view illustrating a typical LCD device. An LCD device 11 includes an upper substrate 5 and a lower substrate 22 that are opposed to each other, and a liquid crystal layer 14 interposed therebetween. The upper substrate 5 and the lower substrate 22 are called a color filter substrate and an array substrate, respectively. On the upper substrate 5, a black matrix 6 and a color filter layer 7 including a plurality of red (R), green (G), and blue (B) color filters are formed. The black matrix 6 surrounds each color filter such that an array matrix feature is formed. Further on the upper substrate 5, a common electrode 18 is formed to cover the color filter layer 7 and the black matrix 6.

On the lower substrate 22 on a side opposing the upper substrate 5, thin film transistors (TFTs) "T" are formed in shape of an array matrix corresponding to the color filter layer 7. In addition, a plurality of crossing gate and data lines 13 and 15 are positioned such that each TFT "T" is located near each crossing portion of the gate and data lines 13 and 15. The crossing gate and data lines define a pixel region "P". A pixel electrode 17 is formed on the pixel region "P". The pixel electrode 17 is made of transparent conductive material, such as ITO (Indium-Tin-Oxide) or IZO (Indium-Zinc-Oxide), which has excellent light transmissivity.

In the above-mentioned LCD panel, the liquid crystal molecules of the liquid crystal layer 14 are arranged in accordance with the signals applied to the pixel electrode 17 through the TFT "T". The light passing through the liquid crystal layer 14 is controlled by the arrangement of the liquid crystal molecules.

FIG. 2 is a partial plan view of a conventional array substrate of active matrix liquid crystal display (AM-LCD). As shown in FIG. 2, the array substrate 22 of an AM-LCD includes a thin film transistor "T", a pixel electrode 17 and a storage capacitor "C". A gate line 13 is arranged in a transverse direction and a data line is arranged perpendicular to the gate line 13 in the array substrate 22. A pair of gate line 13 and data line 15 define a pixel region "P". The TFT "T" includes a gate electrode 26, a source electrode 28, a drain electrode 30 and an active layer 24, and is arranged at one corner of the pixel region "P" where the data line 15 crosses the gate line 13. The gate electrode 26 extends longitudinally from the gate line 13 into the pixel region "P" and the source electrode 28 extends transversely from the data line 15 into the pixel region "P". The drain electrode 30 is spaced apart from the source electrode 28 to form a channel region on the active layer 24. The storage capacitor "C" is a storage-on-gate type capacitor in which a portion of the pixel electrode 17 overlaps a portion of the gate line 13. The portion of the gate line 13 serves as a first capacitor electrode and the portion of the pixel electrode 17 serves as a second capacitor electrode. Although not shown in FIG. 2, an insulator serving as a dielectric layer in the storage capacitor is interposed between the gate line 13 and the pixel electrode 17, thereby forming an MIM (metal-insulator-metal) structure.

The operation of the TFT "T" and the capacitance of the storage capacitor "C" have an influence on the operating characteristics of the array substrate shown in FIG. 2. Therefore, it is very important that the structure and configuration of the TFT and storage capacitor should be designed and fabricated properly.

The thin film transistor (TFT) "T" generally has the channel region on the active layer 24 between the source and drain electrodes 28 and 30. Thus, the operating characteristics of the TFT are dependent on the channel region's configuration, such as a channel width "W" and a channel length "L". Furthermore, a portion of the drain electrode 30 overlaps a portion of the gate electrode 28, thereby forming an overlapped area "M". Due to this overlapped area "M", a gate-drain parasitic capacitance $C_{gd}$ occurs in the TFT "T". Since this parasitic capacitance $C_{gd}$ has a bad influence on the operating characteristics of the TFT, decreasing the parasitic capacitance $C_{gd}$ is a significant issue when designing the thin film transistor. In the thin film transistor, the parasitic capacitance can be given by following equation (1), $$C_{gd} = \varepsilon \frac{A_{gd}}{d_{gd}} \tag{1}$$

where $A_{gd}$ denotes the overlapped area "M", $d_{gd}$ denotes a distance between the gate electrode 26 and the drain electrode 30, and epsilon $\varepsilon$ is the permittivity of the dielectric layer. From the above equation, it is easily noticeable that the parasitic capacitance $C_{gd}$ decreases as the overlapped area "M" becomes smaller.

Furthermore, the parasitic capacitance $C_{gd}$ deteriorates the liquid crystal layer and is closely related to a direct current offset voltage $\Delta V_p$. The relation between $C_{gd}$ and $\Delta V_p$ is expressed by the following equation (2), $$\Delta V_P = V_{SC} - V_{PC} = V_g \frac{C_{gd}}{C_t} \quad (2)$$

where voltage $V_{sc}$ denotes a center voltage of a signal voltage, voltage $V_{pc}$ denotes a center voltage of the pixel electrode, voltage $V_g$ denotes voltage of the gate electrode, and the total capacity $C_t = C_{gs} + C_S$ (storage capacitor) $+ C_{Lc}$ (liquid crystal capacitor). If $C_{gd}$ is much smaller than $C_S$ or $C_{LC}$ in the equation (2), the denominator $C_t$ equals $C_s + C_{LC}$, and will thus be assumed a constant. Accordingly, the magnitude of $\Delta V_p$ is proportional to the size of $C_{gd}$. As the $C_{gd}$ becomes smaller, the operation characteristics of the array substrate improve.

The direct current offset voltage $\Delta V_p$ contributes to inferior display images by causing afterimages, image inconsistency and poor reliability of the LCD. Thus, to obtain superior video quality, the size of $\Delta V_p$ should be reduced. According to the equation (2), to lower the $\Delta V_p$ value, the $C_{gd}$ must also be lowered, which can be accomplished by decreasing the overlapped area "M". Further, if the $C_{gd}$ is fixed at a certain value, the $\Delta V_p$ value is compensated by the common voltage.

However, the size of the overlapped area "M" varies because the gate and drain electrodes 26 and 30 can be misaligned during the manufacturing processes, thereby causing the variation of the $C_{gd}$ value. Therefore, the $\Delta V_p$ value also changes, and thus it is very difficult to compensate the $\Delta V_p$ value using the common voltage.

Accordingly, the thin film transistor having the above-mentioned structure and configuration shown in FIG. 2 has the following problems. First, if the misalignment occurs between the gate electrode 26 and the drain electrode 30, the size of the overlapped area "M" varies. Second, since the thin film transistor "T" is positioned at one corner of the pixel region "P", the aperture ratio of the pixel decreases, thereby deteriorating the brightness of the liquid crystal panel. To overcome these problems, another TFT structure and configuration are introduced as shown in FIG. 3.

FIG. 3 is a partial plan view of another conventional array substrate of active matrix liquid crystal display (AM-LCD). As shown in FIG. 3, the thin film transistor (TFT) "T" is positioned over the gate line 13 compared the TFT shown in FIG. 2. Since the TFT is not positioned at one corner of the pixel region "P", the aperture ratio increases and the brightness of the liquid crystal panel is also raised. Further in FIG. 3, since the channel region "CH" on the active layer 24 has an L shape between the source and drain electrodes 28 and 30, the operating characteristics of the TFT "T" improve.

However, since a portion of the gate line 13 serves as a gate electrode and the TFT "T" is formed on this portion of the gate line 13, there are other problems occurring in the storage capacitor "C". Namely, the size and capacitance of the storage capacitor "C" are lessened because the TFT "T" occupies much space on the gate line 13. Therefore, it is rather difficult to obtain an enough capacitance of the storage capacitor "C". Further, if the misalignment occurs between the gate electrode (a portion of the gate line 13) and the drain electrode 30, the overlapped area "M" changes. Thus, the afterimage or the image inconsistency may occur in the LCD device.

FIG. 4 is a partial plan view of another exemplary of the conventional array substrate for use in an active matrix liquid crystal display (AM-LCD). In FIG. 4, a gate electrode 26 extends from the gate line 13 into the pixel region "P", and the source electrode 28 extends from the data electrode 15 over the gate line 13. The gate electrode 26 has an L shape, and the drain electrode 30 is shaped like L. A first portion of the drain electrode 30 overlaps a portion of the gate electrode 26 and a second portion of the drain electrode 30 contacts the pixel electrode 17 through a contact hole 32. The TFT "T" is positioned both over the gate line 13 and at one corner of the pixel region "P", and thus, the TFT "T" occupies less space of the gate line 13. Therefore, the size of the storage capacitor "C" can increase and the capacitance thereof can also increase. Further, the aperture ratio is rather improved than the array substrate shown in FIG. 2.

Further in FIG. 4, the channel region "CH" on the active layer 24 between the source and drain electrodes 28 and 30 has an L shape like the TFT shown in FIG. 3, the channel width "W" is enlarged and the operating characteristics of the TFT "T" also improve. However, since the misalignment may occur between the gate electrode 26 and the drain electrode 30, the overlapped area "M" changes like the TFT shown in FIG. 3. Thus, afterimage or image inconsistency may occur in the LCD device because of the variation of the gate-drain parasitic capacitance $C_{gd}$.

SUMMARY OF THE INVENTION

Accordingly, the present invention is directed to an array substrate for use in an LCD device that substantially obviates one or more of the problems due to limitations and disadvantages of the related art.

An advantage of the present invention is to provide an array substrate having an increased aperture ratio and a storage capacitor having sufficient capacitance.

Another advantage of the present invention is to provide an array substrate having improved operating characteristics and narrow variation in a gate-drain parasitic capacitance $C_{gd}$.

Another advantage of the present invention is to provide a method of manufacturing an array substrate having improved operating characteristics and narrow variation in a gate-drain parasitic capacitance $C_{gd}$.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for use in a liquid crystal display device includes a substrate; a gate line arranged in a transverse direction on the substrate; a data line arranged perpendicular to the gate line and forming a pixel region with the gate line; a thin film transistor positioned near an intersection of the gate and data lines; and wherein the thin film transistor includes a gate electrode, an active layer, a source electrode, and a drain electrode; wherein the gate electrode has a slanted corner slanted to the gate line; wherein the source electrode has a U shape and is positioned over the gate electrode; wherein the drain electrode has a drain protrusion which is positioned over the gate electrode and slanted corner and located inside the U-shaped source electrode; wherein the drain protrusion is spaced apart from the U-shaped source electrode so as to form a channel region therebetween; and wherein an imaginary axis of the U-shaped source electrode and drain protrusion forms an angle with the gate line; a pixel electrode contacting the drain electrode.

In the above-mentioned array substrate, the angle between the imaginary axis and the gate line ranges from 30 to 60 degrees. In one aspect, the angle is 45 degrees. Beneficially, the U-shaped source electrode and the drain protrusion can be positioned over the gate line.

The array substrate further comprises a longitudinal pattern that is formed of the same material as the active layer and connected with the active layer. The longitudinal pattern has the same shape as the data line and is positioned below the data line.

In the above array substrate, the pixel electrode is made of a transparent conductive material selected from a group consisting of indium tin oxide and indium zinc oxide. Further, the above array substrate further comprises a gate insulation layer between the gate electrode and the active layer, and a storage capacitor which includes a portion of the gate line as a first capacitor electrode, a second capacitor electrode and the gate insulation layer as a dielectric layer. Here, the gate insulation layer is an inorganic material selected from a group consisting of silicon nitride and silicon oxide.

In another aspect, a method of fabricating an array substrate for use in a liquid crystal display device includes the steps of: forming a gate line and a gate electrode on a substrate, the gate line arranged in a transverse direction, and the gate electrode extended from the gate line; forming a data line perpendicular to the gate line, thereby defining a pixel region with the gate line; forming an active layer over the gate electrode; forming a source electrode and a drain electrode when forming the data line; and wherein the source electrode has a U shape and is positioned over the gate electrode; wherein the drain electrode has a drain protrusion which is positioned over the gate electrode and inside the U-shaped source electrode; wherein the drain protrusion is spaced apart from the U-shaped source electrode so as to form a channel region therebetween; and wherein an imaginary axis of the U-shaped source electrode and drain protrusion forms an angle with the gate line; forming a pixel electrode contacting the drain electrode.

In the above-mentioned method, the gate electrode has a slanted corner slanted to the gate line, and the drain protrusion overlaps the slanted corner of the gate electrode. The angle between the imaginary axis and the gate line ranges from 30 to 60 degrees. In one aspect, the angle is 45 degrees. Beneficially, the U-shaped source electrode and the drain protrusion can be positioned over the gate line.

The above method further comprises a step of forming a longitudinal pattern, which is formed of the same material as the active layer and connected with the active layer, when forming the active layer. The longitudinal pattern has the same shape as the data line and is positioned below the data line.

In the above method, the pixel electrode is made of a transparent conductive material selected from a group consisting of indium tin oxide and indium zinc oxide. Further, the above method further comprises a step of forming a gate insulation layer between the gate electrode and the active layer, and a step of forming a second capacitor electrode on the gate insulation layer and over the gate line when forming the data line, thereby forming a storage capacitor. The storage capacitor includes a portion of the gate line as a first capacitor electrode, the second capacitor electrode and the gate insulation layer as a dielectric layer. Here, the gate insulation layer, as a dielectric layer, is an inorganic material selected from a group consisting of silicon nitride and silicon oxide.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, which are illustrated in the accompanying drawings. Wherever possible, the same reference numbers will be used throughout the drawings to refer to the same or like parts.

Figure 5A:
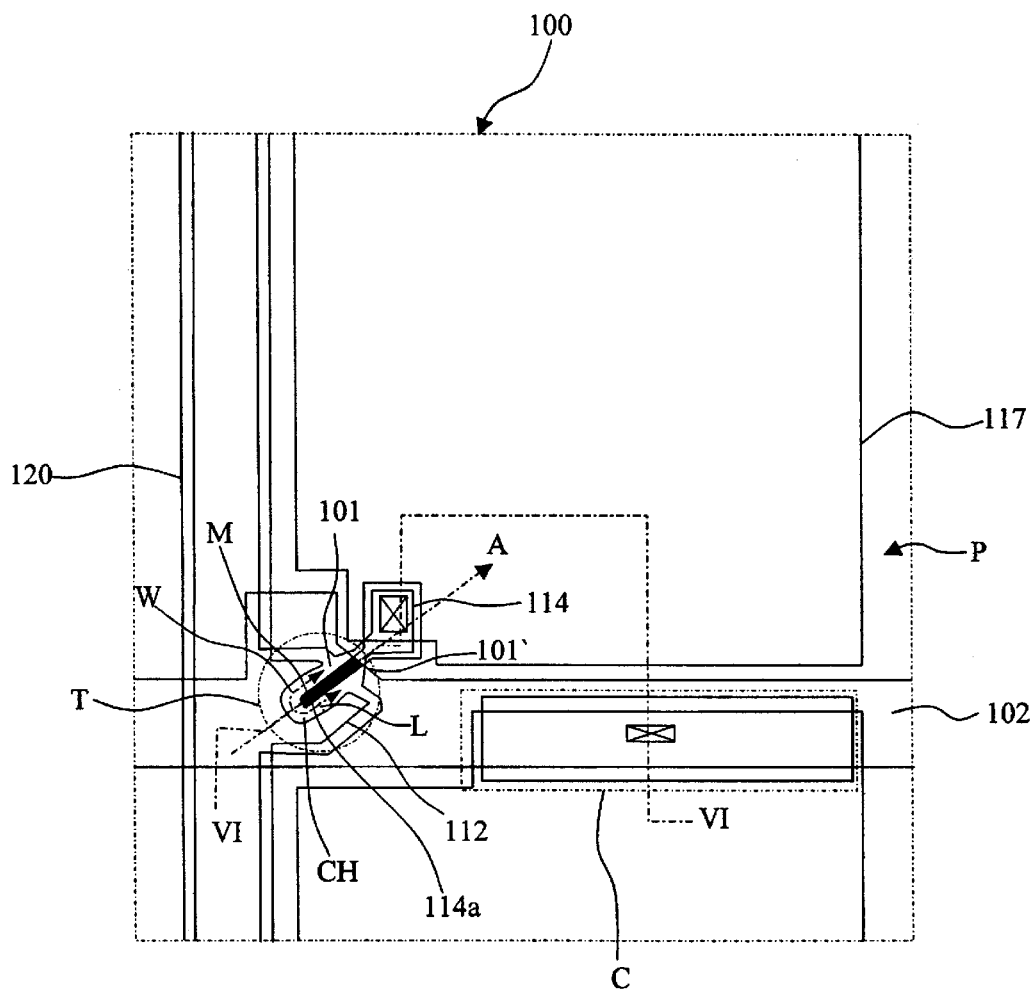
FIG. 5A is a partial plan view of an array substrate of an liquid crystal display device according to the present invention.
Figure 5B:
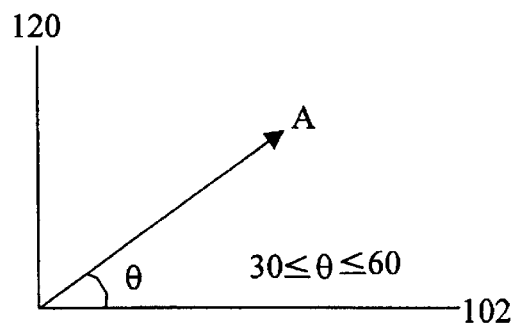
FIG. 5B is a conceptual graph schematically illustrating an angle of a drain electrode with the gate line.

FIG. 5A is a partial plan view of an array substrate of a liquid crystal display device according to the present invention, and FIG. 5B is a conceptual graph schematically illustrating an angle between a drain electrode and a gate line. As shown in FIG. 5A, the array substrate 100 of the first embodiment includes a gate line 102 arranged transversely, and a data line 120 arranged perpendicular to the gate line 102. A pair of gate and data lines 102 and 120 define a pixel region "P", in which a pixel electrode 117 is located. A portion of the gate line 102 and a protrusion extended from the gate line 102 serve as a gate electrode 101 in the present invention. The gate electrode 101 of the present invention has a slanted corner 101' slanted from the gate electrode 101 to the gate line 102. A source electrode 112 having a U shape extends from the data line 120 to the gate electrode 101, and a drain electrode 114 having a drain protrusion 114a over the gate electrode 101 is spaced apart from the U-shaped source electrode 112. Namely, the drain protrusion 114a is positioned at the inside of the U-shaped source electrode 112 and spaced apart from the U-shaped source electrode 112 to form a channel region "CH" therebetween. Further, the drain protrusion 114a overlaps the gate electrode 101 and slanted corner 101' to form an overlapped area "M" with the gate electrode 101 and the slanted corner 101'. From this point of view, a imaginary axis "A" of the drain protrusion 114a and U-shaped source electrode 112 forms an angle θ with the gate line 102 as shown in FIG. 5B. This angle θ ranges from greater than or equal to about 30 degrees to less than or equal to 60 degrees (30°≦θ≦60°). In one embodiment, the angle θ is about 45 degrees.

Accordingly, in this structure and configuration of a thin film transistor (TFT) "T", although the misalignment occurs between the gate electrode 101 and the drain electrode 114, the variation of the gate-drain parasitic capacitance $C_{gd}$ is not wide because of the U-shaped source electrode 112 and the drain protrusion 114a. Further, since the gate electrode 101 has the slanted corner 101', the slanted corner 101' corresponding to the drain protrusion 114a prevents misalignment between the gate and drain electrodes, thereby decreasing the variation of the size of the overlapped area "M". Additionally, although the gate-drain parasitic capacitance $C_{gd}$ occurs, it does not have an influence on the image quality because of its narrow variation. The advantages of the above-described array substrate are as follows.

First, the TFT can be fabricated as small as possible. Since the source electrode 112 has the U shape and the drain protrusion 114a of the drain electrode 114 is located in the U-shaped source electrode 112, the TFT "T" occupies less space than the conventional drain electrode.

Second, due to the U-shaped source electrode and the drain electrode 114 having the protrusion, the channel region "CH" is also shaped like a U shape and has a short channel length "L" and the wide channel width "W". Therefore, the TFT "T" as a switching element has rapid operating characteristics.

Third, since the TFT "T" is formed over the gate line 102, increased aperture ratio can be obtained.

Fourth, due to the small-sized TFT "T", the size of the storage capacitor "C" having the storage-on-gate type increases, thereby obtaining sufficient capacitance.

Fifth, since the imaginary axis "A" of the U-shaped source electrode 112 forms the angle θ ranging from 30 to 60 degrees, the capacitance of storage capacitor "C" and the aperture ratio of pixel region "P" are maximized.

Furthermore, although misalignment between the drain electrode 114 and the gate electrode 101 occurs during the manufacturing processes, the size of the overlapped area "M" does not vary significantly because of the slanted corner 101' of the gate electrode 101. Thus, the liquid crystal display device can obtain the stable image quality.

FIGS. 6A to 6J are plan views and cross-sectional views each taken along the line VI—VI of corresponding plan view and illustrates inventive manufacturing processes of an array substrate of FIG. 5A according to the present invention.

Figure 6A:
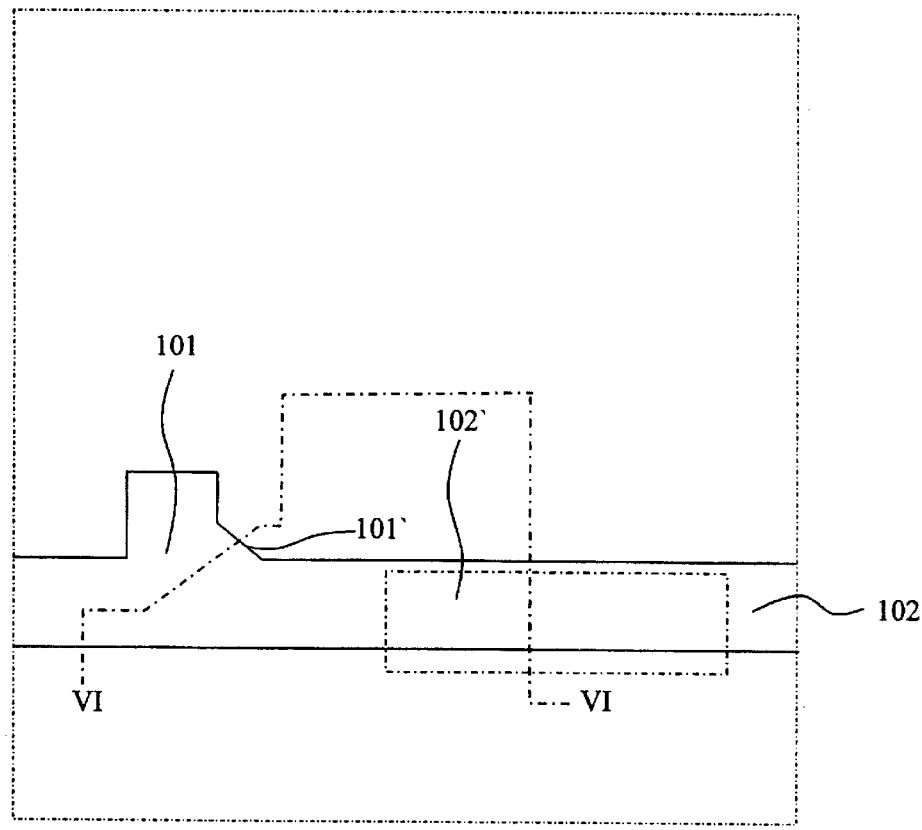
FIGS. 6A to 6J are plan views and cross-sectional views each taken along the line VI—VI of corresponding plan view and illustrates inventive manufacturing processes of an array substrate of FIG. 5A according to the present invention.
Figure 6B:
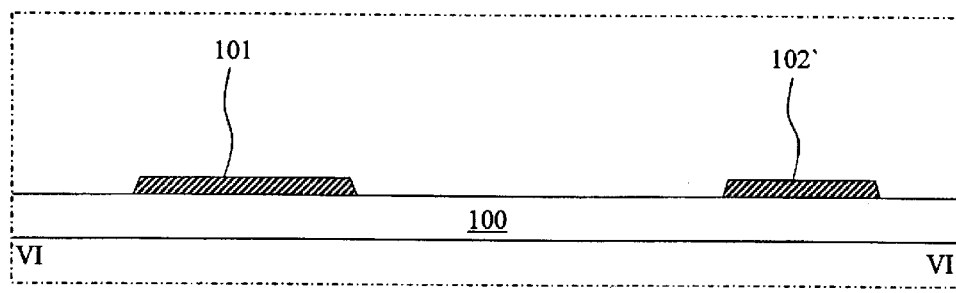

FIGS. 6A and 6B are respectively a plan view and cross-section view which shows a step of forming a gate line 102 and a gate electrode 101. Referring to FIGS. 6A and 6B, a first metal, such as aluminum (Al), aluminum neodymium (AlNd), chromium (Cr) or molybdenum (Mo), is deposited on a substrate 100, and then patterned so as to form the gate line 102 and the gate electrode 101. The gate electrode 101 protrudes from the gate line 102 in a longitudinal direction, and has a slanted corner 101' slanted to the gate line 102. A portion 102' of the gate line 102 serves as a first capacitor electrode in the storage capacitor "C" of FIG. 5A.

If the first metal is aluminum or aluminum neodymium (AlNd), the gate line 102 and gate electrode 101 have a double-layered structure by depositing molybdenum (Mo) or chromium (Cr) on the first metal. This is to reduce the RC-delay in the gate line. Although the aluminum-based material (aluminum or aluminum neodymium) as the first metal has a low resistance, the aluminum-based material is weak at an acid chemical material. Therefore, the gate line may have an open circuit by way of being etched by an etching solution. Therefore, molybdenum (Mo) or chromium (Cr), which has superior corrosion resistance, is formed on the aluminum-based material in order to form the double-layered gate line and gate electrode.

Figure 6C:
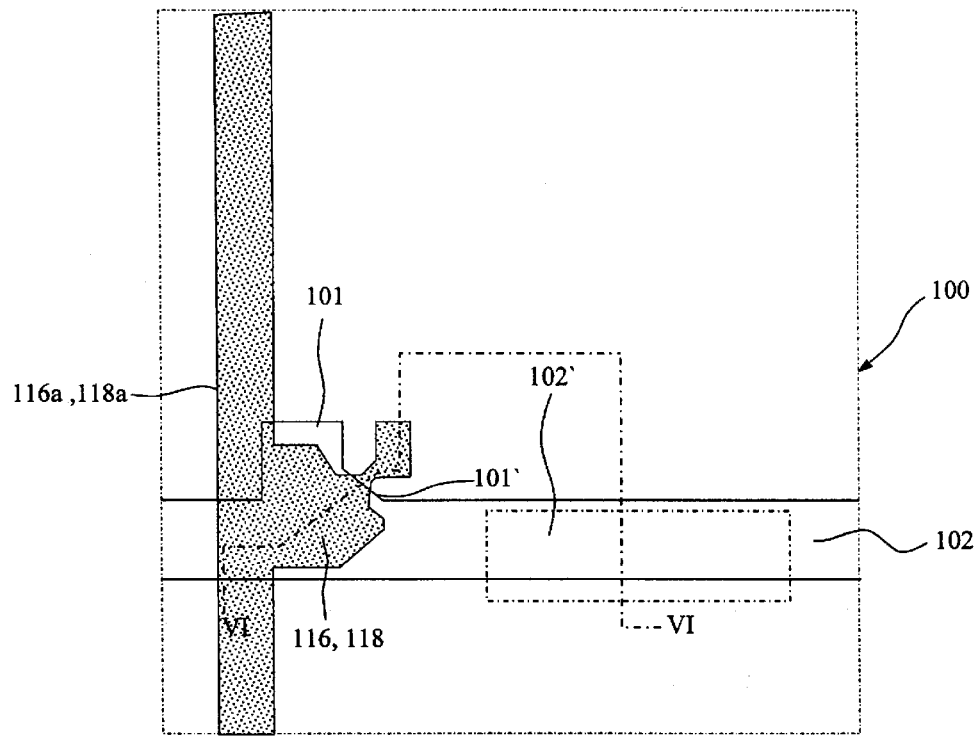
Figure 6D:
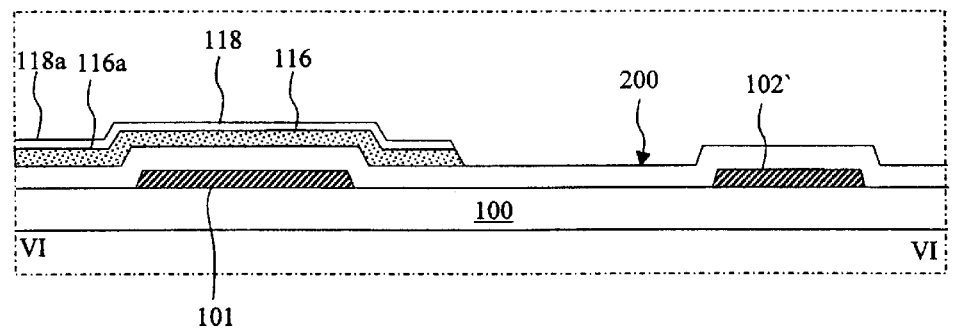

FIGS. 6C and 6D show a step of forming an active layer and an ohmic contact layer over the gate electrode. As shown in FIGS. 6C and 6D, a gate insulation layer 200 is formed on the whole surface of the substrate 100 to cover the patterned first metal. Here, the gate insulation layer 200 is an inorganic material, such as silicon nitride ($SiN_x$) or silicon oxide ($SiO_2$), or an organic material, such as benzocyclobutene (BCB) or acryl-based resin. Thereafter, a substantially pure amorphous silicon layer (a-Si:H) and a doped amorphous silicon layer ($N^+$ a-Si:H) are deposited in series on the gate insulation layer 200, and then patterned to form an active layer 116 and an ohmic contact layer 118, respectively, over the gate electrode 101 having the slated corner 101'. At this time, longitudinal patterns 116a and 118a are formed with the active layer 116 and ohmic contact layer 118 in a position where a data line is formed in a later step. The reason for forming the longitudinal patterns 116a and 118a is to increase the adhesion of the data line 120 (in FIGS. 6E and 6F) in a later step.

Figure 6E:
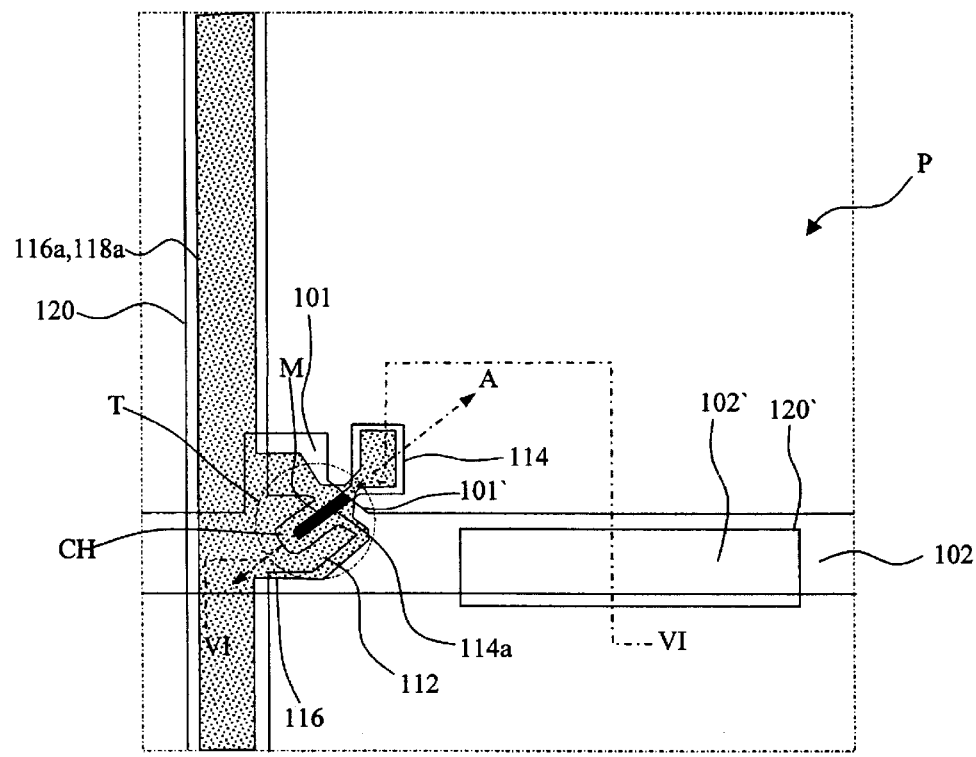
Figure 6F:
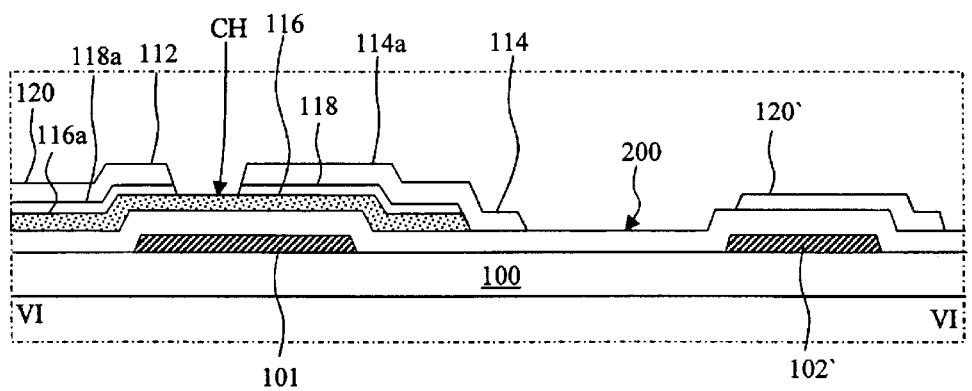

FIGS. 6E and 6F show a step of forming a data line 120 and a second capacitor electrode 120'. As shown, a second metal is formed on the gate insulation layer 200 to cover the patterned amorphous silicon layers, and then patterned to form the data line 120, the second capacitor electrode 120', a source electrode 112 and a drain electrode 114 having a drain protrusion 114a. The data line 120 is formed on the longitudinal patterns 116a and 118a, perpendicular to the gate line 102. The source electrode 112 having the U shape is extends from the data line 120 over the gate electrode 101, and the drain electrode 114 having the drain protrusion 114a is spaced apart from the source electrode 112. The second capacitor electrode 120', which has an island shape, is positioned over the portion 102' of the gate line 102.

Figure 1:
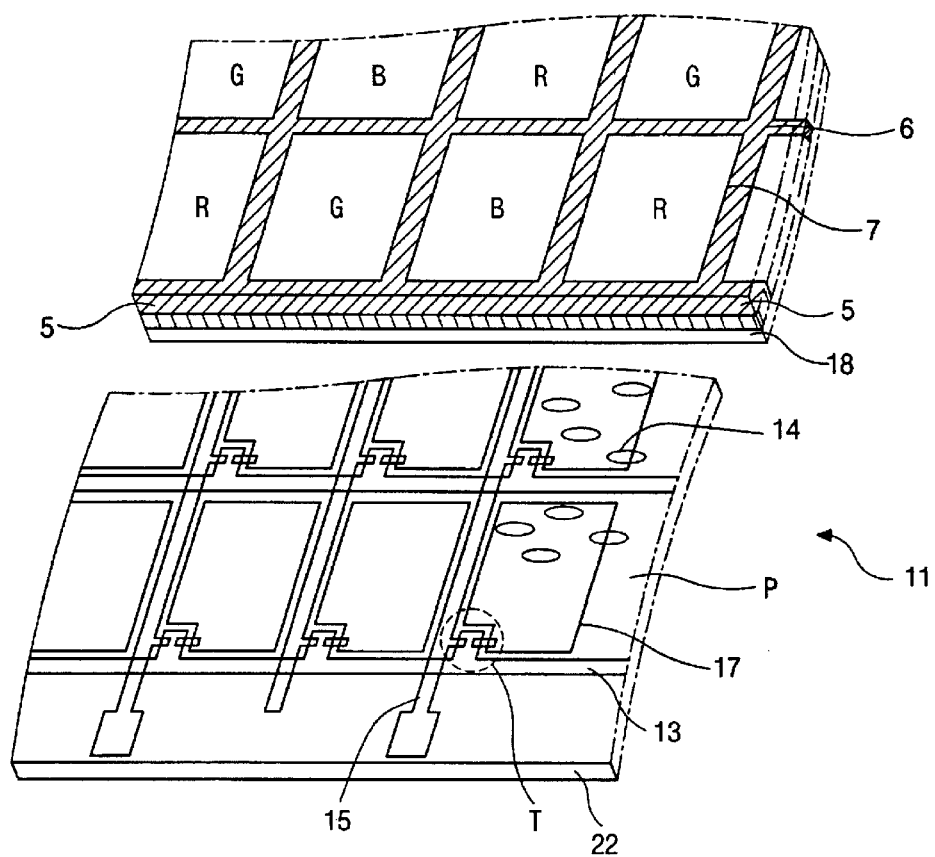
FIG. 1 is an exploded perspective view illustrating a typical LCD device.
Figure 2:
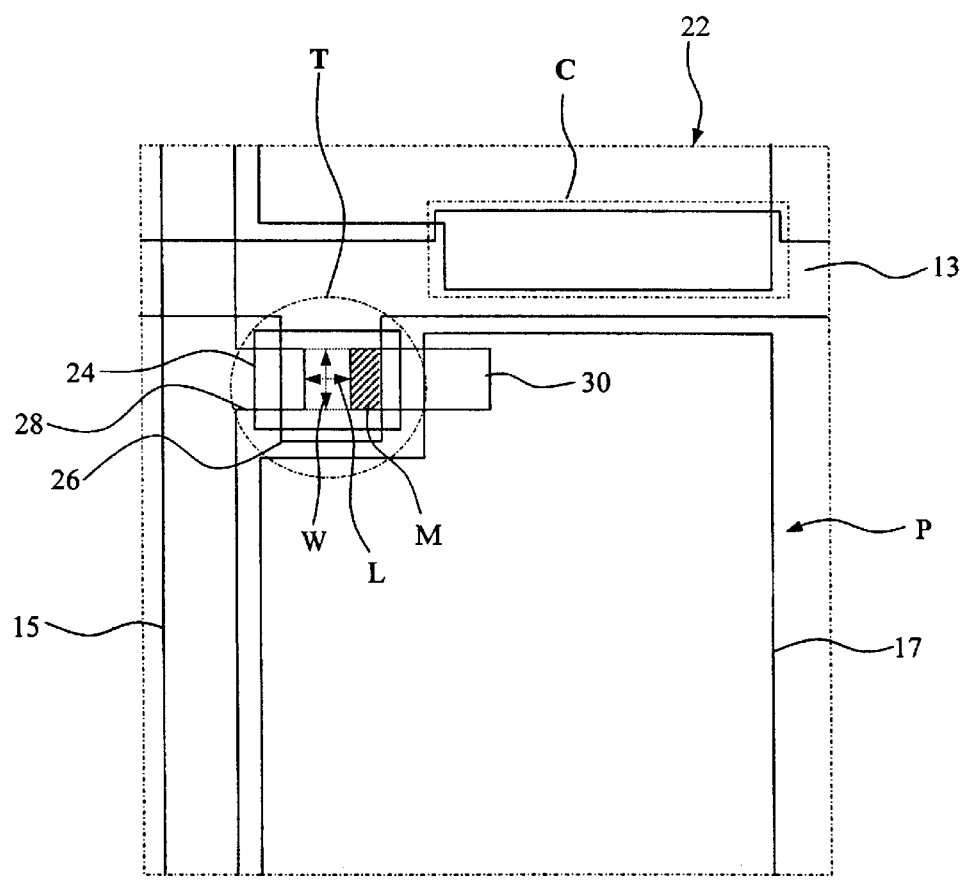
FIG. 2 is a partial plan view of a conventional array substrate of active matrix liquid crystal display (AM-LCD)
Figure 3:
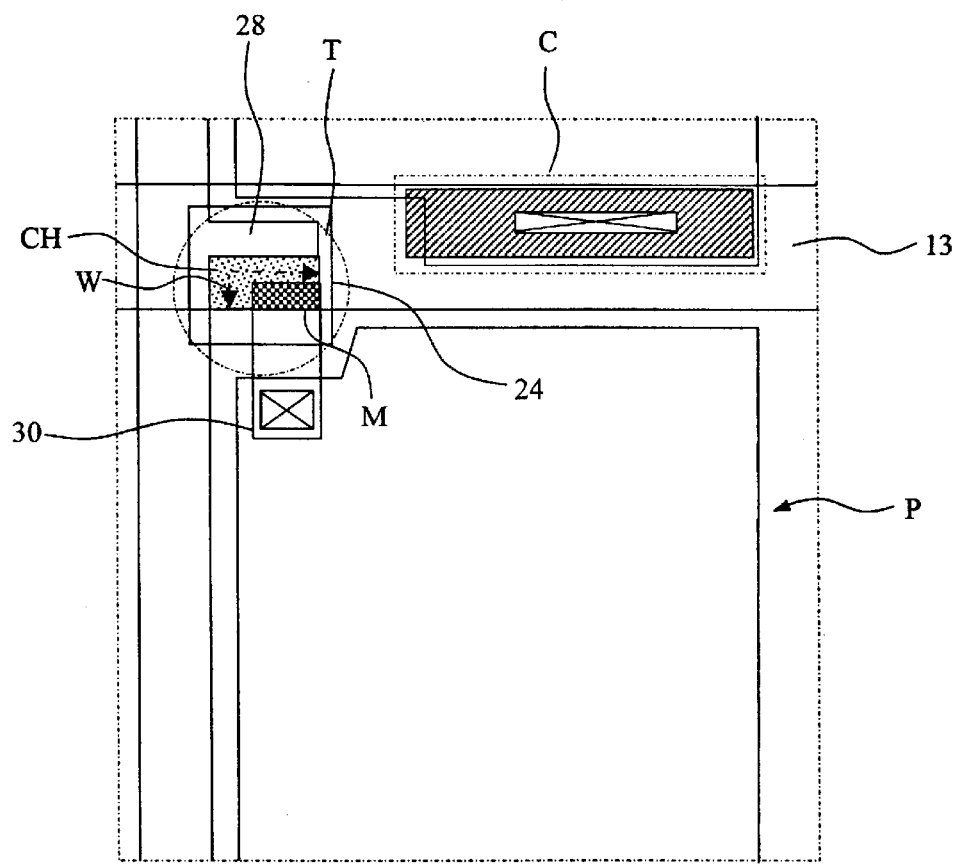
FIG. 3 is a partial plan view of another conventional array substrate of active matrix liquid crystal display (AM-LCD)
Figure 4:
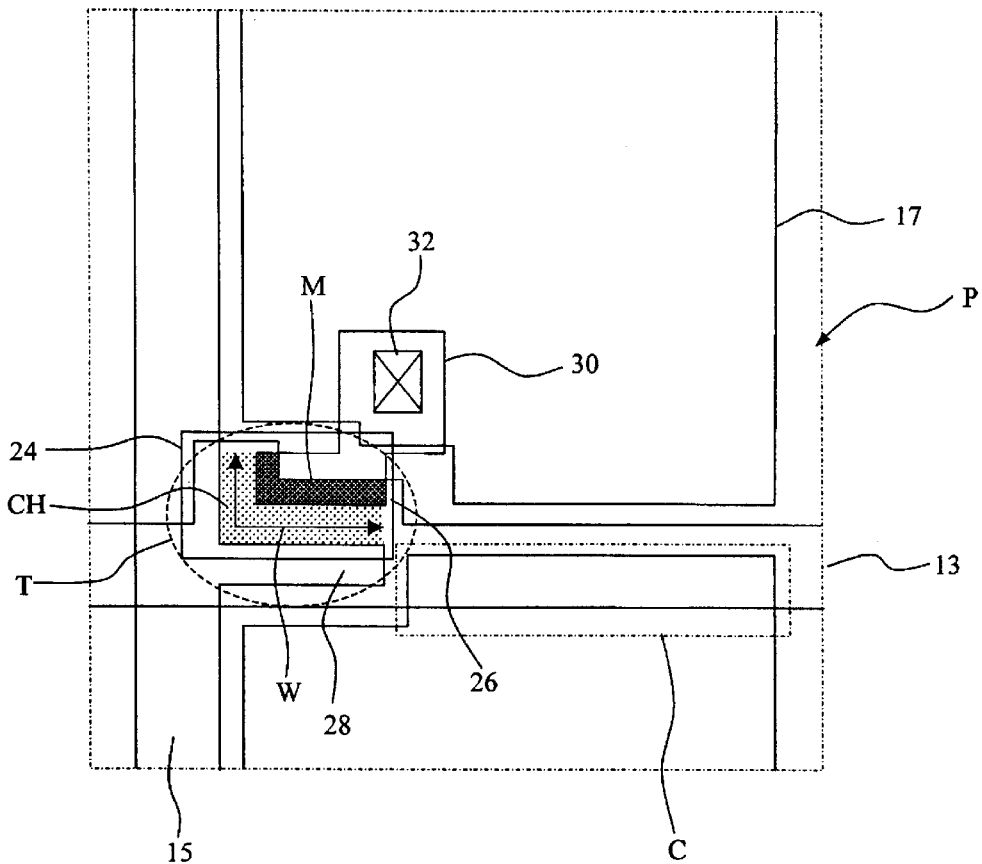
FIG. 4 is a partial plan view of another exemplary of the conventional array substrate for use in an active matrix liquid crystal display (AM-LCD)

Furthermore, the drain electrode 114 is substantially positioned at one corner of the pixel region "P", while the drain protrusion 114a is protrudes over the gate electrode 101 and slanted corner 101'. Thus, the drain protrusion 114a is located over the slanted corner 101' and in the inside of the U-shaped source electrode 112, and thus, the size of the TFT "T" is decreased compared to the conventional TFT shown in FIGS. 2, 3 and 4. At this time when forming the source electrode 112 and the drain electrode 114, if an imaginary axis "A" of the source electrode 112 and drain protrusion 114a forms an angle with the gate electrode 102, the TFT "T" can occupy much less space in the gate line 102. In one embodiment, the angle θ ranges from 30 to 60 degrees (30≦θ≦60) as shown in FIG. 5B. In other words, when the angle θ is equal to or greater than 30 degrees and less than or equal to 60 degrees, the size of the TFT "T" is minimized, and the overlapped area "M" does not vary, even if misalignment occurs between the gate electrode 101 and the drain electrode 114. The optimized value of the angle θ is 45 degrees in the present invention. Moreover, since the drain protrusion 114a overlaps the gate electrode 101 over the slanted corner 101', the size variation of the overlapped area "M" is prevented.

Still referring to FIGS. 6E and 6F, a portion of the ohmic contact layer 118 between the source electrode 112 and the drain protrusion 114a is etched to expose the active layer and to form a channel region "CH" using the source electrode 112 and the drain electrode 114 having the drain protrusion as masks. The reason for forming the channel region "CH" is to reduce the leakage current.

Figure 6G:
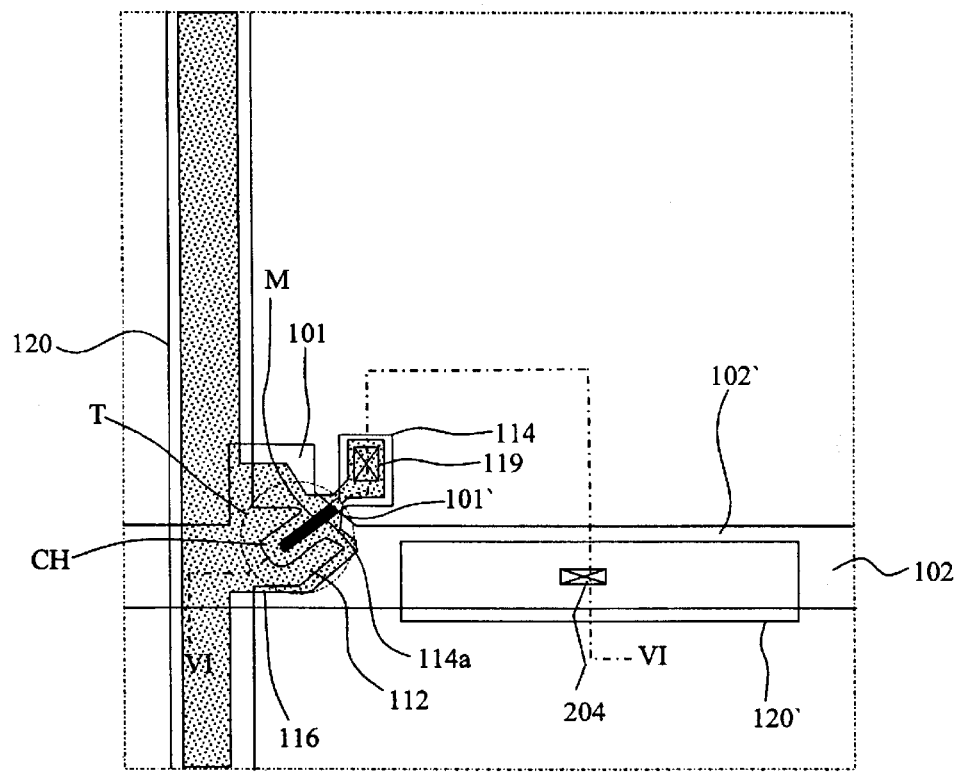
Figure 6H:
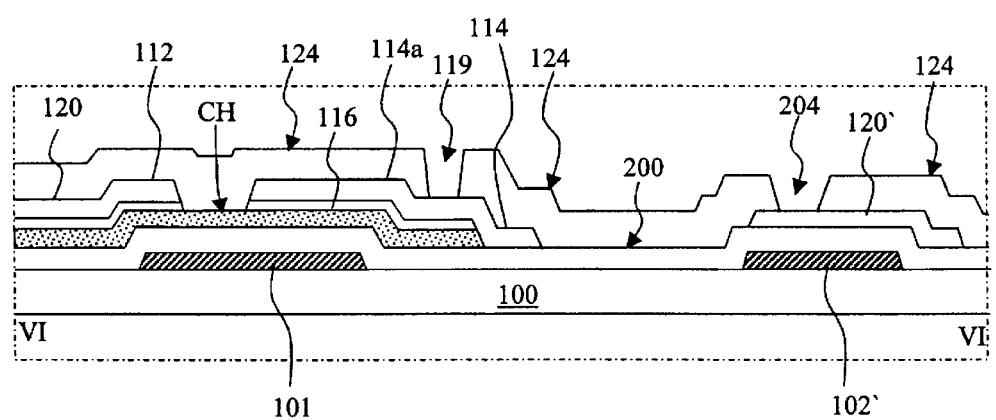

FIGS. 6G and 6H show a step of forming a passivation layer 124 having contact holes 119 and 204. As shown, a passivation layer 124 is formed on the gate insulation layer 200 to cover the patterned second metal, and then patterned to form a drain contact hole 119 and a capacitor contact hole 204. The drain contact hole 119 exposes a portion of the drain electrode 114, and the capacitor contact hole 204 exposes a portion of the second capacitor electrode 120'.

Figure 6I:
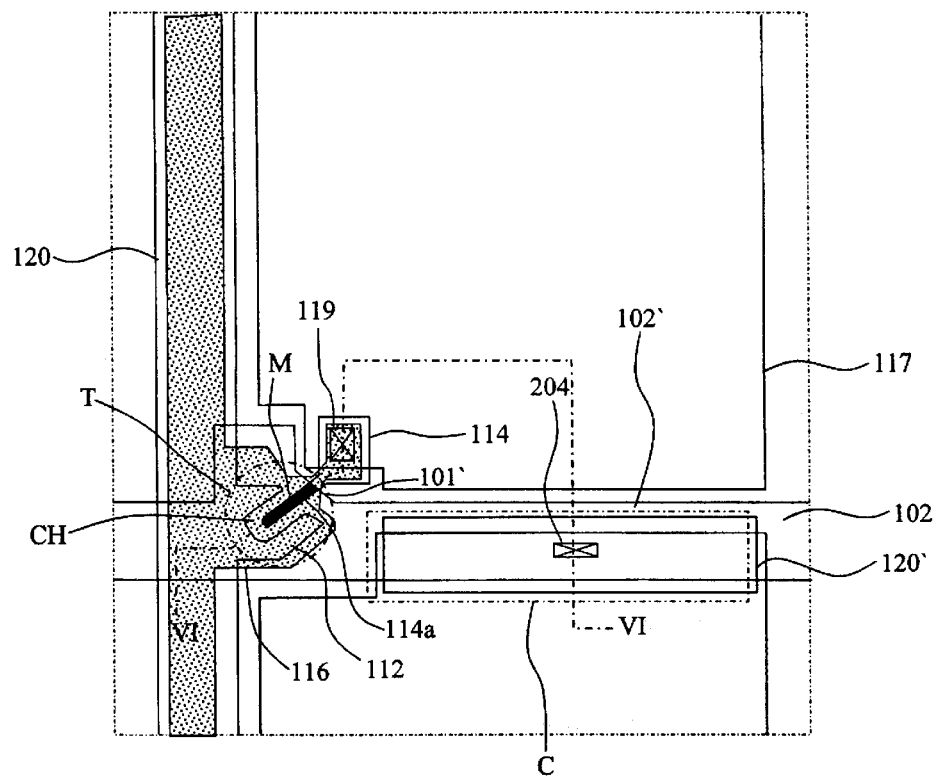
Figure 6J:
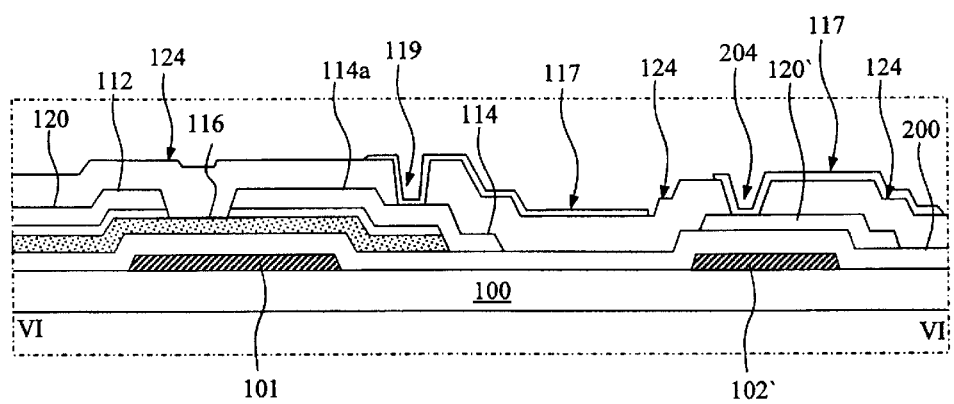

FIGS. 6I and 6J show a step of forming a pixel electrode 117. As shown in FIGS. 6I and 6J, a transparent conductive material, such as indium tin oxide (ITO) or indium zinc oxide (IZO), is deposited on the passivation layer 124 and then patterned to form the pixel electrode 117. At this time, a first portion of the pixel electrode 117 contacts the drain electrode 114 through the drain contact hole 119, and a second portion of the pixel electrode 117 contacts the second capacitor electrode 120' through the capacitor contact hole 204. Therefore, the storage capacitor "C" comprising the first 102' and second 120' capacitor electrodes and the gate insulation layer 200 as a dielectric layer is complete.

Accordingly through the above-mentioned fabricating processes, the array substrate for use in the LCD device is complete according to the present invention. However, the source electrode and the drain electrode can have a different shape and be positioned in a relatively different place.

Accordingly, the array substrate for use in the liquid crystal display device according to the present invention has the following advantages.

First, since the source electrode has the U-shape and the drain protrusion is positioned inside the U-shaped source electrode, the source and drain electrodes occupy less area. Therefore, the aperture ratio increases due to the small size of the TFT. Further, even if misalignment occurs between the drain electrode and the gate electrode during manufacturing, the variation of the parasitic capacitance $C_{gd}$ is not large due to the U-shaped source electrode, the drain protrusion and the slanted corner of the gate electrode.

Second, when the imaginary axis of the U-shaped source electrode forms an angle ranging from 30 to 60 degrees with the gate line, the storage capacitor can have a large size. Therefore, the capacitance of the storage capacitor increases.

Third, since the active layer and the ohmic contact layer, formed of the substantially pure amorphous silicon and doped amorphous silicon, respectively, are positioned below the data line, the adhesion of the data line is improved. Thus, the stabilized liquid crystal panel can be obtained.

Fourth, due to the U-shaped source electrode and drain protrusion, a wide channel width and a short channel length are obtained. Therefore, the TFT of the array substrate can have rapid operating characteristics.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. An array substrate for use in a liquid crystal display device, comprising:
   a substrate;
   a gate line arranged in a transverse direction on the substrate;
   a data line arranged substantially perpendicular to the gate line and forming a pixel region with the gate line;
   a thin film transistor positioned near an intersection of the gate and data lines;
   wherein the thin film transistor includes a gate electrode, an active layer, a source electrode, and a drain electrode;
   wherein the source electrode is substantially U shaped and is over the gate electrode;
   wherein the drain electrode has a drain protrusion over the gate electrode and located inside the substantially U-shaped source electrode;
   wherein the drain protrusion is spaced apart from the substantially U-shaped source electrode so as to form a channel region therebetween; and
   wherein an imaginary axis of the substantially U-shaped source electrode and drain protrusion forms an angle with the gate line; and
   a pixel electrode contacting the drain electrode.

2. The array substrate of claim 1, wherein the gate electrode has a substantially slanted edge slanted to the gate line.

3. The method of claim 2, wherein the drain protrusion overlaps the substantially slanted edge of the gate electrode.

4. The method of claim 1, wherein the angle between an imaginary axis and the gate line ranges from about 30 to about 60 degrees.

5. The array substrate of claim 1, wherein the angle between an imaginary axis and the gate line is about 45 degrees.

6. The array substrate of claim 1, wherein the substantially U-shaped source electrode and the drain protrusion are over the gate line.

7. The array substrate of claim 1, further comprising a longitudinal pattern that is formed of the same material as the active layer and connected with the active layer.

8. The array substrate of claim 7, wherein the longitudinal pattern has the same shape as the data line and is below the data line.

9. The array substrate of claim 1, wherein the pixel electrode is made of a transparent conductive material selected from a group consisting of indium tin oxide and indium zinc oxide.

10. The array substrate of claim 1, further comprising a gate insulation layer between the gate electrode and the active layer.

11. The array substrate of claim 10, further comprising a storage capacitor which includes a portion of the gate line as a first capacitor electrode, a second capacitor electrode and the gate insulation layer as a dielectric layer.

12. The arrays substrate of claim 11, wherein the gate insulation layer is an inorganic material selected from a group consisting of silicon nitride and silicon oxide.

13. The array substrate of claim 1, further comprising a passivation layer between the pixel electrode and the thin film transistor.

14. A method of fabricating an array substrate for use in a liquid crystal display device, the method comprising:
   forming a gate line and a gate electrode on a substrate, the gate line arranged in a transverse direction, and the gate electrode extending from the gate line;
   forming a data line perpendicular to the gate line, thereby defining a pixel region with the gate line;
   forming an active layer over the gate electrode;
   forming a source electrode and a drain electrode when forming the data line;
   wherein the source electrode is substantially U shaped and is over the gate electrode;
   wherein the drain electrode has a drain protrusion which is positioned over the gate electrode and inside the substantially U-shaped source electrode;
   wherein the drain protrusion is spaced apart from the U-shaped source electrode so as to form a channel region therebetween; and wherein an imaginary axis of the substantially U-shaped source electrode and drain protrusion forms an angle with the gate line; and forming a pixel electrode contacting the drain electrode.

15. The method of claim 14, wherein the gate electrode has a substantially slanted edge slanted to the gate line.

16. The method of claim 15, wherein the drain protrusion overlaps the substantially slanted edge of the gate electrode.

17. The method of claim 14, wherein the angle between an imaginary axis and the gate line ranges from about 30 to about 60 degrees.

18. The method of claim 14, wherein the angle between an imaginary axis and the gate line is about 45 degrees.

19. The method of claim 14, wherein the substantially U-shaped source electrode and the drain protrusion are over the gate line.

20. The method of claim 14, further comprising forming a longitudinal pattern when forming the active layer.

21. The method of claim 20, wherein the longitudinal pattern is formed of the same material as the active layer and connected with the active layer.

22. The method of claim 20, wherein the longitudinal pattern has the same shape as the data line and is below the data line.

23. The method of claim 14, wherein the pixel electrode is made of a transparent conductive material selected from a group consisting of indium tin oxide and indium zinc oxide.

24. The method of claim 14, further comprising forming a gate insulation layer between the gate electrode and the active layer.

25. The method of claim 24, further comprising forming a second capacitor electrode on the gate insulation layer and over the gate line when forming the data line, thereby forming a storage capacitor.

26. The method of claim 25, wherein the storage capacitor includes a portion of the gate line as a first capacitor electrode, the second capacitor electrode and the gate insulation layer as a dielectric layer.

27. The method of claim 25, wherein the gate insulation layer is an inorganic material selected from a group consisting of silicon nitride and silicon oxide.

28. The method of claim 14, further comprising forming a passivation layer between the pixel electrode and the thin film transistor.

* * * * *